United States Patent
Manneschi et al.

(10) Patent No.: US 12,352,847 B2
(45) Date of Patent: Jul. 8, 2025

(54) LOW-BULK INTEGRATED DETECTOR

(71) Applicants: Alessandro Manneschi, Arezzo (IT); Luca Manneschi, Arezzo (IT)

(72) Inventors: Alessandro Manneschi, Arezzo (IT); Luca Manneschi, Arezzo (IT)

( * ) Notice: Subject to any disclaimer, the term of this patent is extended or adjusted under 35 U.S.C. 154(b) by 338 days.

(21) Appl. No.: 17/778,553

(22) PCT Filed: Nov. 13, 2020

(86) PCT No.: PCT/EP2020/082005
§ 371 (c)(1),
(2) Date: May 20, 2022

(87) PCT Pub. No.: WO2021/099217
PCT Pub. Date: May 27, 2021

(65) Prior Publication Data
US 2023/0019713 A1    Jan. 19, 2023

(30) Foreign Application Priority Data
Nov. 21, 2019 (FR) ...................... 1913046

(51) Int. Cl.
*G01S 13/88* (2006.01)
*G01V 3/10* (2006.01)
*G01V 8/00* (2006.01)

(52) U.S. Cl.
CPC ............ *G01S 13/887* (2013.01); *G01V 3/107* (2013.01); *G01V 8/005* (2013.01)

(58) Field of Classification Search
CPC ....... G01S 13/887; G01V 3/107; G01V 8/005
See application file for complete search history.

(56) References Cited

U.S. PATENT DOCUMENTS

| | | | |
|---|---|---|---|
| 6,308,644 | B1 | 10/2001 | Diaz |
| 2003/0137420 | A1 | 7/2003 | Turner et al. |
| 2005/0232459 | A1 | 10/2005 | Rowe et al. |
| 2009/0321638 | A1 | 12/2009 | Hu et al. |

(Continued)

FOREIGN PATENT DOCUMENTS

| | | |
|---|---|---|
| CN | 109116433 A | 1/2019 |
| EP | 2202700 A1 | 6/2010 |
| RU | 2589238 C1 | 7/2016 |

OTHER PUBLICATIONS

International Search Report for Application No. PCT/EP2020/082005 Mailed Dec. 4, 2020, pp. 1-4.

(Continued)

*Primary Examiner* — David P Porta
*Assistant Examiner* — Fani Polyzos Boosalis
(74) *Attorney, Agent, or Firm* — Lerner David LLP

(57) ABSTRACT

The present invention relates to a dual-technology detecting system, comprising: an archway, a metal detector housed in a first segment of the side panels, a millimetre-wave body scanner housed in a second segment of the side panels, said body scanner comprising at least one antenna configured to emit radiant energy, wherein, within the first segment, the internal faces of the side panels are separated by a distance at least equal to 800 mm and smaller than or equal to 900 mm, and within the second segment, a maximum distance between the internal faces of the side panels is larger than or equal to 1000 mm and smaller than or equal to 1200 mm.

20 Claims, 4 Drawing Sheets

(56) References Cited

U.S. PATENT DOCUMENTS

| | | |
|---|---|---|
| 2011/0102597 A1 | 5/2011 | Daly et al. |
| 2015/0134288 A1* | 5/2015 | Kurrant ................. G01S 13/887 |
| | | 702/85 |
| 2016/0216371 A1* | 7/2016 | Ahmed ................... G01S 13/89 |
| 2021/0293988 A1* | 9/2021 | Manneschi .............. G01V 3/10 |

OTHER PUBLICATIONS

French Search Report for Application No. FR1913046 dated Jul. 27, 2020, pp. 1-4. [See p. 3, categorizing the cited references].
Russian Search Report for Application No. 2022114255/07 dated Dec. 28, 2023, 2 pages. [See p. 1-2, categorizing the cited references].

* cited by examiner

LOW-BULK INTEGRATED DETECTOR

CROSS-REFERENCE TO RELATED APPLICATIONS

The present application is a national phase entry under 35 U.S.C § 371 of International Application No. PCT/EP2020/082005 filed Nov. 13, 2020, which claims priority from French Patent Application No. 1913046 filed Nov. 21, 2019, all of which are hereby incorporated herein by reference.

FIELD OF THE INVENTION

The present invention relates to the field of detectors designed for the detection of unauthorized objects or substances in an access-protected area. More specifically, the invention relates to the integration of an inductive-type metal detector and of a body scanner designed to inspect individuals at the entrance or the exit of a sensitive area, for example passengers before boarding at airports or individuals accessing a public site, such as a stadium or an auditorium, in order to detect prohibited objects concealed under clothing. Such systems allow in particular avoiding systematic palpation.

STATE OF THE ART

It appears now necessary to monitor with great reliability the attempts to introduce prohibited products, in particular weapons, into a sensitive area or to get them out of it.

The problem thus posed covers a very wide range of situations, which encompasses in particular and without limitation the attempt to introduce prohibited products into a protected area, such as an airport, a store, a school, a train station, a public or private organization, or the attempt to get products out of a defined perimeter, for example in case of theft in a company or on a protected site.

Different types of metallic object detectors exist. Generally metal detectors are inductive-type detectors. They comprise at least one transmitting coil and at least one receiving coil. The transmitting coil is powered by an alternating electric current. The receiving coil is designed to detect disturbances of the magnetic field generated by the transmitting coil due to the presence of a metallic object, for example the attenuation of the amplitude of the magnetic field, or the signal phase change, due for example to the eddy currents generated on the metallic object.

The use of body scanners has also been proposed. The oldest body scanners are X-ray body scanners. Newer body scanners use wave technology called millimeter-wave technology. An example of a body scanner can be found in document EP 2 202 700.

For several years, body scanners have been developed in order to detect weapons, explosives, etc. hidden under the clothing of individuals entering a protected area. These scanners use technologies based on the detection of radiant energies modulated, reflected or emitted by the body of the inspected individuals. The thus used radiant energies comprise x-rays, microwaves, millimeter waves, infrared light, terahertz waves, and ultrasound.

Despite the use of several types of radiant energies and imaging geometries, these body scanners all aim at creating an electronic image of the individual on which the individual's clothing is transparent. This image is then displayed on a screen and viewed by an operator in order for him to determine whether the individual is carrying a target object. For this, the operator, who is trained to detect target objects, must be able to determine whether the objects identified by the body scanner correspond to human anatomy, to an authorized object such as a lighter, a handkerchief or parts, or to a target object such as a weapon or an explosive.

Alternatively, in order to respect the privacy of the inspected persons, the system can comprise software comprising code instructions to automatically analyze the image and determine the presence of any anomalies and display them on an avatar representing the person.

Nowadays, it turns out that individuals who attempt to fraudulently introduce a prohibited object, in particular a weapon, into a protected area use a great deal of imagination to conceal said objects, for example separate the object into different pieces that they distribute over the body. The examination using body scanners consequently becomes increasingly complex and long to carry out, even in some impossible cases, if the target object has been concealed so as not to be reachable by the radiant energy, for example inside a body cavity or between the person's body and another surface that is not penetrable by the radiant energy. Furthermore, while the existing metal detectors are the most efficient solution for detecting the existence or not of a metallic object, they cannot locate a non-metallic object on an individual.

It has therefore been proposed to combine a metal detector with a body scanner, in order to improve the detection of target objects capable of being camouflaged on the body of an individual. Typically, in document EP 2 202 700, a combined walk-through detector comprises a metal detector housed in the uprights of the walk-through detector and a vertical scanner carrying a plurality of sensors configured to scan a person from top to bottom.

This combined walk-through detector effectively allows combining several technologies within the same device. However, the current standards impose constraints in terms of space available within the detector in order, in particular, to allow the passage of wheelchairs in the walk-through detectors. For example, according to the American standard ADAAG (for Americans with Disabilities Act Accessibility Guidelines) a passage having a depth less than or equal to 24 inches (610 mm) must have a minimum width at least equal to 32 inches (810 mm). On the other hand, when the passage has a depth greater than 24 inches (610 mm), the width of the passage must be at least equal to 36 inches (915 mm) in order to allow a person in a wheelchair to turn within this passage. Other standards exist on these dimensions, in particular Italian or English standards. However, all require a minimum width for the deep passages of the corridor type at least equal to 915 mm.

These different standards (hereinafter referred to as "dimensional standards") must be compared with the detection accuracy required at the entrance of the sensitive areas. Typically, in the case of a metal detector, the space between the coils cannot be equal to 915 mm or more given the aimed sensitivities to guarantee sufficient detection of the target objects.

In order to meet these dimensional standards, it was therefore proposed to place a metal detector and body scanner in series, so that each system can be dimensioned and optimized individually. However, due to the electromagnetic incompatibilities between the metal detector and the body scanner, the metal detector must then be placed at a certain distance from the body scanner. Indeed, the body scanner comprises many metal parts, power supply systems and other electromagnetic scanning, likely to generate disturbing low and medium frequency electromagnetic fields which interfere with the receiving inductive coils of the metal detector. In addition, the distance between the metal detector and the body scanner allows limiting the risks of false detection in the event of relative movement, even sub-millimeter movement, between the coils of the metal detector and the metal mass which constitutes the structure of the body scanner and which is much greater (1,000-10,000 times) than the mass of the metal target to be detected. However, such a configuration not only has the effect of drastically increasing the footing of the complete system, but also of allowing inspected persons to pass each other within the system and/or to only pass through one of the detection devices or even to reverse their order of passage (the person passing first through the metal detector can be overtaken by the person following them before entering the body scanner if the operators are not vigilant), which completely distorts the detection and the information read by the operators at the exit of the system.

It has also been proposed to produce a compact combined walk-through detector comprising rotatably movable detection means mounted in a cylindrical wall whose diameter is on the order of 1,500 mm. However, the entrance of this walk-through detector has a thickness less than 600 mm and therefore does not comply on its own with the constraints imposed by the dimensional standards. This is why this walk-through detector is systematically associated with an additional detector capable of allowing the passage of wheelchairs. The total space requirement of the assembly formed by the walk-through detector, certainly compact but also comprising the additional detector, therefore remains too large.

DISCLOSURE OF THE INVENTION

One aim of the invention is to propose a dual technology detection system with high detection efficiency, for applying with certainty the dual analysis to each checked person, which limits the risks of false detection and which has a low space requirement while complying with the dimensional standards allowing in particular the passage of a wheelchair.

For this purpose, there is proposed, according to a first aspect of the invention, a dual technology detection system comprising:
 a walk-through detector, said walk-through detector comprising two side panels substantially symmetrical with respect to a plane and configured to define a transit channel for an inspected person, said side panels comprising successively a first portion at an entrance of the channel and a second portion extending between the first portion and an exit of the channel, the first portion and the second portion being monolithic, the side panels each having an inner face, the inner face of one of the side panels facing the inner face of the other of the side panels,
 a metal detector housed in the first portion of the side panels comprising a transmitting assembly configured to emit a magnetic field and a receiving assembly configured to detect disturbances of the magnetic field due to a target object, and
 a body scanner housed in the second portion of the side panels, said body scanner comprising at least one antenna configured to emit radiant energy.

Furthermore, within the first portion, the inner faces of the side panels are separated by a distance at least equal to 800 mm and less than or equal to 900 mm, and within the second portion, a maximum distance between the inner faces of the side panels is greater than or equal to 1,000 mm and less than or equal to 1,200 mm.

Some preferred but non-limiting characteristics of the detection system according to the first aspect are the following, taken individually or in combination:
 within the second portion, a distance between the inner faces at the second portion of the side panels gradually increases up to the maximum distance, then gradually decreases towards the exit of the channel.
 the inner faces of the panels are substantially curved or planar piecewise.
 a radius of curvature of the inner faces of the side panels, in the second portion, is comprised between 180 cm and 220 cm.
 a depth of the first portion is comprised between 250 mm and 350 mm, preferably on the order of 300 mm.
 the distance between the inner faces at the first portion is equal to 820 mm.
 a total depth of the side panels, between the entrance and the exit of the channel, is comprised between 1,600 mm and 1,800 mm, for example on the order of 1,760 mm.
 the at least one antenna of the body scanner is configured to emit millimeter waves.
 the body scanner comprises an array of antennas, said antennas being arranged along a curved surface.
 the curved surface corresponds to all or part of the inner face of the second portion of one of the side panels.
 the detection system further comprises a processing unit configured to generate a single image from signals generated by the metal detector and from an electronic image created by the body scanner.
 the inner faces of the side panels are substantially planar and parallel at the first portion.
 the first and the second panel each further comprise a metal shield positioned between the transmitting assembly and/or the receiving assembly on the one hand and the at least one antenna on the other hand.
 the shield is made of a material having an electrical conductivity greater than or equal to $35*10^6$ S/m.
 the metal detector is a continuous or pulsed wave detector.
 each panel houses a metal base, the transmitting assembly, the receiving assembly and the antennas all being mounted on this metal base so as to be mounted fixed relative to each other.
 the metal bases are mechanically connected so as to be fixed relative to each other.
 the metal bases are connected at ground level by at least one cross-member.
 the at least one cross-member is metallic, said at least one cross-member being covered at a junction with each panel by an electrically insulating sleeve.
 all or part of the at least one cross-member is covered by the sleeve.
 the at least one cross-member is housed in a platform extending between the panels, said platform being mechanically insulated from said panels.

DESCRIPTION OF THE FIGURES

Other characteristics, aims and advantages of the invention will emerge from the following description which is purely illustrative and not limiting and which should be read in relation to the appended drawings in which.

In all the figures, similar elements bear identical references.

DETAILED DESCRIPTION OF THE INVENTION

Figure 1:
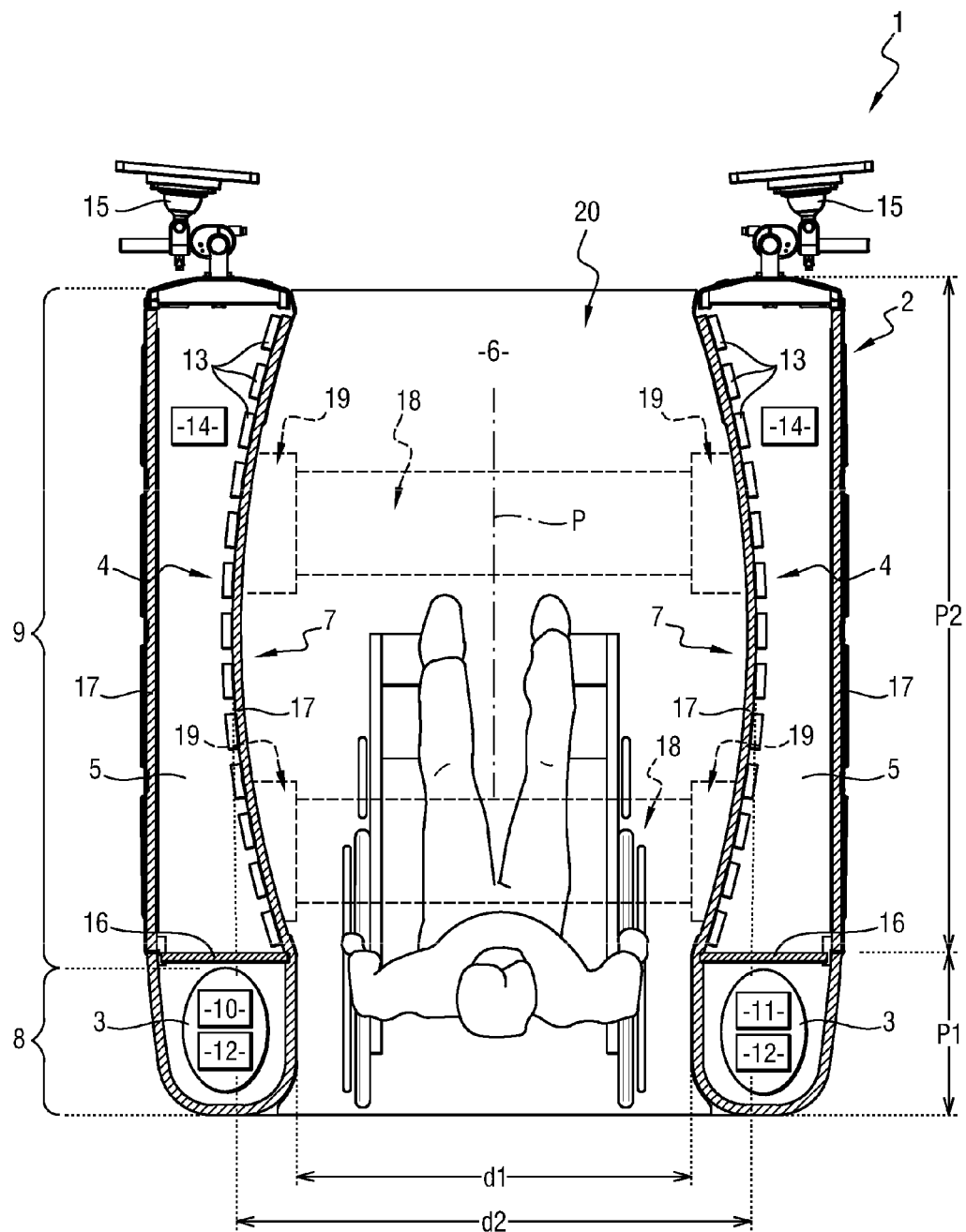
FIG. 1 is a schematic cross-sectional view of one example of a detection system according to a first embodiment of the invention, in which part of the elements concealed under the platform have been represented in dotted lines. A person in a wheelchair is also illustrated as an example at the entrance of the transit channel.
Figure 2:
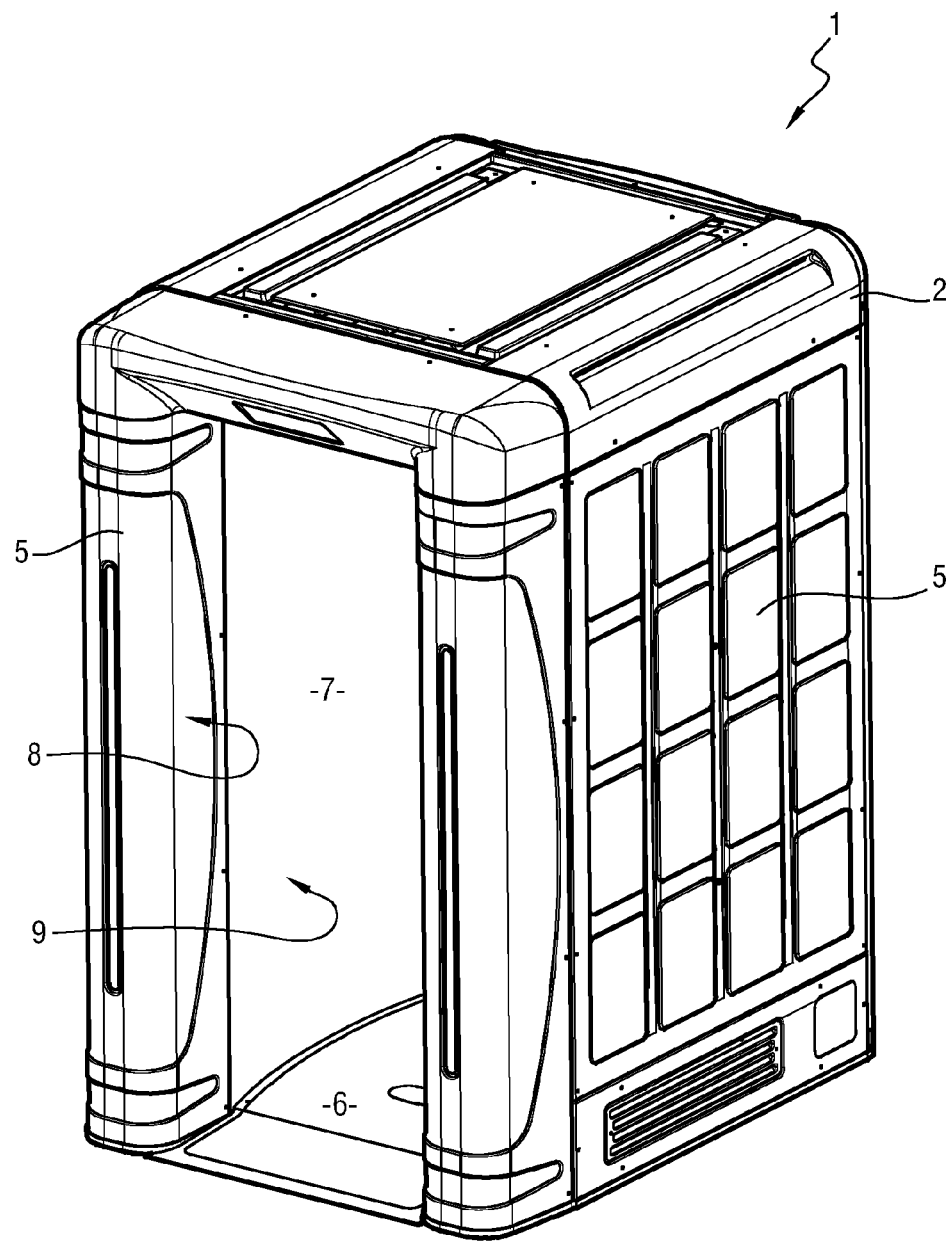
FIG. 2 is a perspective view of another example of a detection system according to one embodiment of the invention.

A dual technology detection system 1 comprises a walk-through detector 2 in which a continuous or pulsed wave metal detector 3 and a body scanner 4 are housed. The metal detector 3 and the body scanner 4 are therefore both integrated into a single structure, which allows reducing the space requirement of the system 1. Moreover, by integrating the metal detector 3 and the body scanner 4 in the same walk-through detector 2, the metal detector 3 and the body scanner 4 are mutually monolithic, thus eliminating any risk of relative movement between these two devices, which greatly improves the stability of the detection system 1. In addition, as the detection system 1 does not comprise a space between the metal detector 3 and the body scanner 4, the persons inspected have no other choice but to pass one after the other through the system 1, through both detection devices 3, 4 and in the correct order (usually, by first passing through the metal detector 3 and then through the body scanner 4).

The Walk-Through Detector 2

The walk-through detector 2 comprises a first side panel 5 and a second side panel 5 substantially symmetrical with respect to a plane P and configured to define therebetween a transit channel 6 for an inspected person. The side panels 5 can be mechanically connected by a ceiling so as to be integral. As a variant, the side panels 5 may be separate and distinct.

Each panel 5 has an inner face 7, oriented towards the transit channel 6. More specifically, the inner face 7 of the first panel 5 faces the inner face 7 of the second panel 5 so as to laterally delimit the channel 6. The panels 5 further each have a first end, or entrance end, which delimit together an entrance in the channel 6 for an inspected person, and a second end, or exit end, which is opposite to the entrance end and defines the exit of the channel 6.

The panels 5 comprise successively, from the entrance to the exit, a first portion 8 which houses the metal detector 3 and is located at the entrance of the channel 6 and a second portion 9, which houses the body scanner 4 and s extends between the first portion 8 and the exit of the channel 6.

In order to obtain an effective detection system 1 in a low space requirement, the inner faces 7 of the panels 5 are separated by a distance d1 greater than or equal to 800 mm and less than or equal to 900 mm within the first portion 8, then by a maximum distance d2 greater than or equal to 1,000 mm and less than or equal to 1,200 mm within the second portion 9.

Here, the distances d1, d2 between the inner faces 7 of the side panels 5 are measured along axes normal to the plane of symmetry P of the walk-through detector 2.

Figure 3:
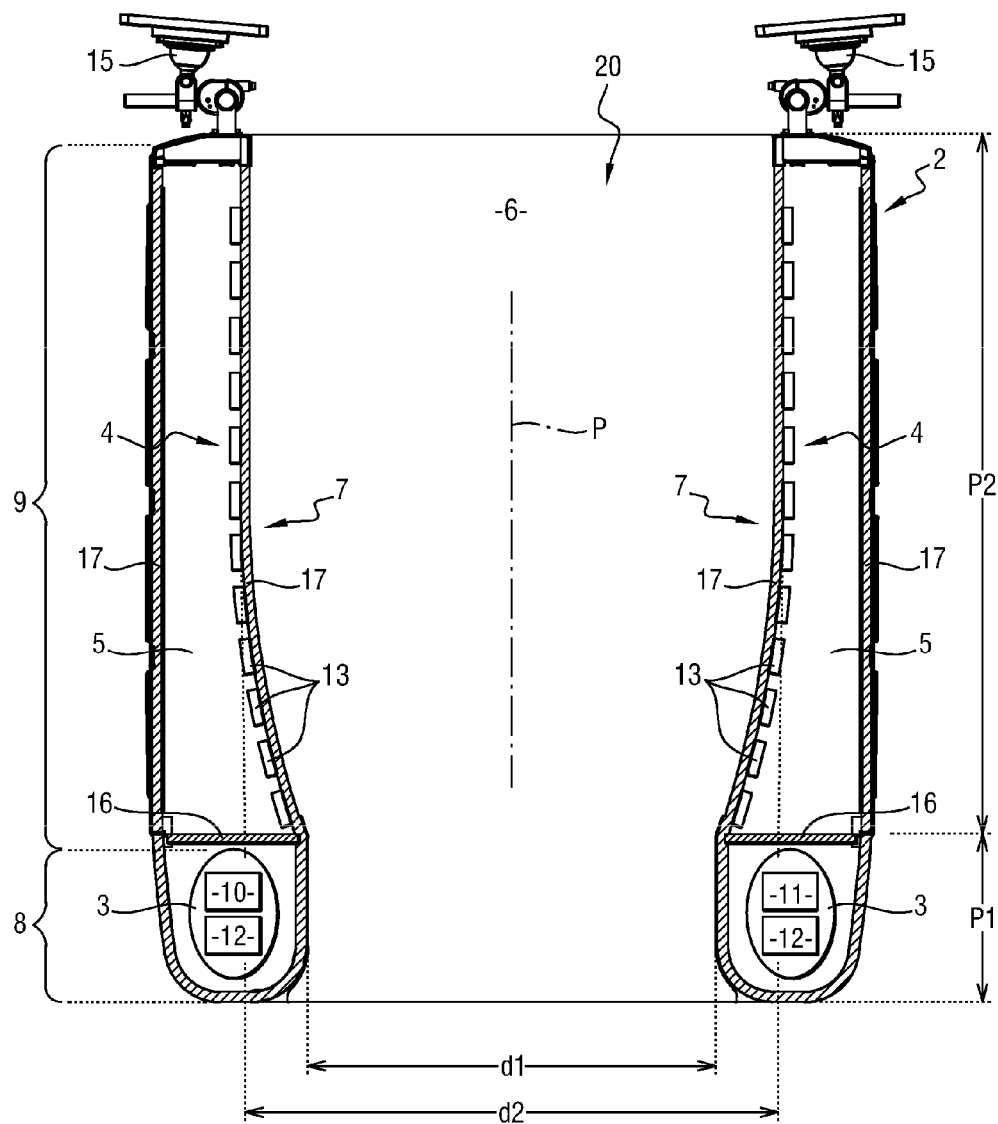
FIG. 3 is a schematic cross-sectional view of one example of a detection system according to a second embodiment of the invention.

In a first embodiment illustrated in FIG. 3, the inner faces 7 of the panels 5 are substantially planar and parallel at the first portion 8 and at the second portion 9. The transition between the inner faces 7 within the first portion 8 and within the second portion 9 can be gradual, as illustrated in FIG. 3, or abrupt (shoulder forming a bend at the interface between the first and the second portion 8, 9).

As a variant, and as will be detailed in the following, in order to increase the detection efficiency and in particular the ability to explore the person inspected by the body scanner 4, the inner faces 7 are curved at the second portion 9 so that the distance between the inner faces 7 at the second portion 9 of the side panels 5 gradually increases from the interface with the first portion 8 up to the maximum distance d2, then gradually decreases towards the exit of the channel 6. In this variant illustrated in particular in FIG. 1, the inner faces 7 of the panels 5 remain substantially planar and parallel at the first portion 8. If applicable, the inner faces 7 can be planar piecewise within the second portion 9, the segments together forming a diverging then converging channel 6 from the interface between the first and the second portion 8, 9 towards the exit. For this, within the second portion 9, the inner faces 7 can for example each successively comprise at least one planar segment inclined with respect to the plane of symmetry P so that the channel 6 diverges (with respect to the direction of passage in the walk-through detector 4, that is to say from the entrance to the exit of the channel 6), then a planar segment substantially parallel to the plane of symmetry P and at least one segment inclined with respect to the plane P so that the channel converges towards the exit.

In the following, the invention will be more particularly described with reference to the embodiment in which the inner faces 7 are curved at the second portion 9. However, this is not limiting, the inner faces 7 possibly being planar within this second portion 9 or planar piecewise.

The first portion 8 of the walk-through detector 2, which houses the metal detector 3, thus allows guaranteeing sufficient sensitivity for the detection of metal, while complying with the current dimensional standards. In one embodiment, the distance d1 between the inner faces 7 within the first portion 8 is on the order of 820 mm (within 3%).

The depth P1 (dimension comprised in the plane of symmetry P of the walk-through detector 2 and extending along the direction of transit of a person inspected in the transit channel 6) of the first portion 8 is comprised between 250 mm and 350 mm, preferably on the order of 300 mm (within 3%). This limited depth P1 of the first portion 8 is indeed sufficient to house the metal detector 3, while complying with the current dimensional standards insofar as this first portion 8 will then not be considered as a corridor.

The transit channel 6 is on the other hand wider at the second portion 9 of the walk-through detector 2, which houses the body scanner 4, in order to allow the entrance of a wheelchair and its pivoting between the side panels 5 so as to position the inspected person facing either of the side panels 5.

As indicated above, the inner faces 7 of the side panels 5 are curved. In one embodiment, a radius of curvature of the inner faces 7 is comprised between 180 cm and 220 cm.

In one embodiment, the distance between the inner faces 7 increases regularly (if applicable, piecewise), from the interface between the first portion 8 (within which the inner faces 7 are substantially parallel) and the second portion 9 until reaching a maximum corresponding to the maximum distance d2, then decreases regularly (if applicable, piecewise), from this maximum up to the exit end of the panels 5. Optionally, the distance between the inner faces 7 at the exit end is substantially equal to the distance d1 between the inner faces 7 at the first portion 8.

In one embodiment, the depth P2 of the second portion 9 of the side panels 5 is comprised between 1,100 mm and 1,300 mm. When the depth P1 of the first portion 8 is on the order of 300 mm and the radius of curvature of the inner faces 7 is on the order of 180 cm and 220 cm, the depth P2 of the second portion 9 can for example be on the order of 1,150 mm. It follows that a total depth (P1+P2) of the system 1 is greater than or equal to 1,400 mm and less than or equal to 1,600 mm, for example on the order of 1,450 mm.

The footing of the system 1 is therefore significantly reduced in comparison with the combined systems of the prior art, while integrating, in the same walk-through detector 2, both a metal detector 3 and a body scanner 4 and complying with the current dimensional standards (including in particular the ADAAG).

The Metal Detector 3

The metal detector 3 comprises a transmitting assembly 10, a receiving assembly 11 and analysis means 12. The transmitting assembly 10 comprises at least one transmitting coil housed in the first panel 5 and configured to emit a magnetic field. The receiving assembly 11 comprises at least one receiving coil housed in the second panel 5 which is configured to detect disturbances of the magnetic field due to metallic objects. Finally, the analysis means 12 are adapted to analyze the signals derived from the receiving coils to detect the presence of metallic objects carried by an individual transiting through said channel 6 formed between the two side panels 5.

The transmitting and receiving coils preferably cover the entire height of the side panels 5. They can be the subject of many embodiments, as used nowadays in conventional walk-through metal detectors 2s. Their operation per se is also conventional. The structure and the operation of the transmitting and receiving coils will therefore not be described in detail hereafter. It will however be noted that, preferably, each transmitting or receiving coil can be formed by several separate coils whose relative distribution over the height of the side panels 5 is adapted to optimize the detection and is controlled by the analysis means 12, if applicable via a transmitting 10a and receiving 11a interface, to emit alternating inductive fields over a frequency range and to receive all of these alternating inductive fields over said frequency range, respectively.

In one embodiment, the metal detector inductive fields generated by the transmitting and receiving coils are in the frequency range comprised between 70 Hz and 50 kHz, preferably between 100 Hz and 50 kHz.

In practice, each of the transmitting and receiving coils may be formed of a plurality of elementary coils or turns, covering a respective part of the height of the first portion 8 of the respective panel 5, to allow discriminating the position of the metal targets detected and thus locating in height the position of these targets.

Furthermore, each of the coils is preferably alternately a transmitting and a receiving coil.

In the case where the first panel and the second panel 5 are separate and distinct, the metal detector 3 further comprises transmission means comprising a wireless communication interface configured to transmit to the transmitting assembly 10 or to the receiving assembly 11 a phase realignment signal in order to realign the phase of the clock of the receiving assembly 11 with that of the clock of the transmitting assembly 10. Reference may in particular be made to document FR 1906685 filed on Jun. 20, 2019 in the name of the Applicant for more details on this configuration of the walk-through detector 2.

In order to avoid the electromagnetic interference that can be generated by the body scanner 4, the system 1 can further comprise a shield 16 positioned between the metal detector 3 and the body scanner 4. Preferably, each panel 5 can comprise such a shield 16. For example, the shield 16 can comprise a solid vertical metal profile, which may for example have a rectangular section and extending over all or part of a height (dimension comprised in the plane of symmetry P and perpendicular to the ground) of the panels 5, between the transmitting assembly 10 (respectively, the receiving assembly 11) of the metal detector 3 and the antennas 13. Typically, the shields 16 can be positioned at the interface between the first portion 8 and the second portion 9 of the panels 5. Usually, the shields 16 used in the detection systems 1 are made of a material (conductive or non-conductive material) having a high magnetic permeability. However, since such materials are likely to deform, the flux lines of the magnetic field emitted and received by the coils of the metal detector 3, the shields 16 are preferably made of a metallic material with high electrical conductivity. By high electrical conductivity, it will be understood here an electrical conductivity at least equal to $35*10^6$ S/m.

Preferably, in order to improve the effectiveness of the shield 16, said shield 16 extends over the entire height of the transmitting assembly 10 (respectively, of the receiver assembly 11) of the metal detector 3.

To further improve the signal/noise ratio of the metal detector 3, the coils can be positioned in the internal part of the cavity of the panel 5 in which they are installed, so as to reduce the distance between transmitting coil and receiving coil to a minimum and benefit from the maximum uniformity of the inductive field. This disposition also has the advantage of moving the same coils away from the external face of the system 1, by increasing the immunity to the external metal masses in movement.

The Body Scanner 4

The body scanner 4 comprises at least one antenna 13 configured to emit radiant energy, preferably microwave waves such as millimeter waves, X-rays, terahertz waves, etc. In one embodiment, the body scanner 4 comprises an array of antennas 13 positioned in the vicinity of the inner face 7 of the first and/or the second panel 5. The antenna array 13 therefore substantially matches the shape of the associated inner face 7. The Applicant has noticed that the fact of arranging the antennas 13 along a curved (with a regular curvature or piecewise), rather than planar surface, made it possible to increase the efficiency of detection of the body scanner 4 in comparison with a body scanner 4 whose inner faces 7 are planar. Indeed, due to their curved arrangement, the antennas 13 of the body scanner 4 impact a larger surface of the body of the inspected person, thus increasing the inspected surface on the electronic image and therefore the possibilities of detecting a target object.

Preferably, the antennas 13 emit millimeter waves. The millimeter waves are suitable for the detection of metallic and non-metallic objects, such as for example ceramic objects. Furthermore, air and other materials, such as those used for clothing, are transparent to this radiation. It follows that millimeter waves can be used for the detection of objects concealed under clothing. In use, an inspected person is exposed to pulses of millimeter waves generated by at least one of the antennas 13, preferably several antennas 13. These waves interact with the body of the person, their clothing and any object masked possibly concealed by this person under their clothing. This interaction modulates the energy of the waves which, once reflected, return to the antenna(s) 13, which act as a receiver. The energy reflected from each part of the person is then analyzed in order to generate an electronic image of the inspected person, in which their clothing is essentially transparent.

The body scanner 4 furthermore comprises analysis means 14 configured to receive a signal representative of the energy reflected and measured by the antennas 13, if applicable via a network interface 13*a*, and to deduce the electronic image therefrom.

In one embodiment, the detection system 1 further comprises at least one processing unit 15 configured to use the detection signals generated by the metal detector 3 and by the body scanner 4. If applicable, the processing unit comprises the analysis means 12, 14 of the metal detector 3 and of the body scanner 4 and is configured to generate a single output image from signals generated by the metal detector 3 and from the electronic image created by the body scanner 4. If applicable, the system 1 further comprises at least one screen 21, 22, configured to display the single image thus obtained. The screen 21, 22 can be mounted on the walk-through detector 2, for example at the exit end of one of the side panels 5, or alternatively placed remotely and communicate via a wireless or wired interface with the processing unit 15.

Figure 4:
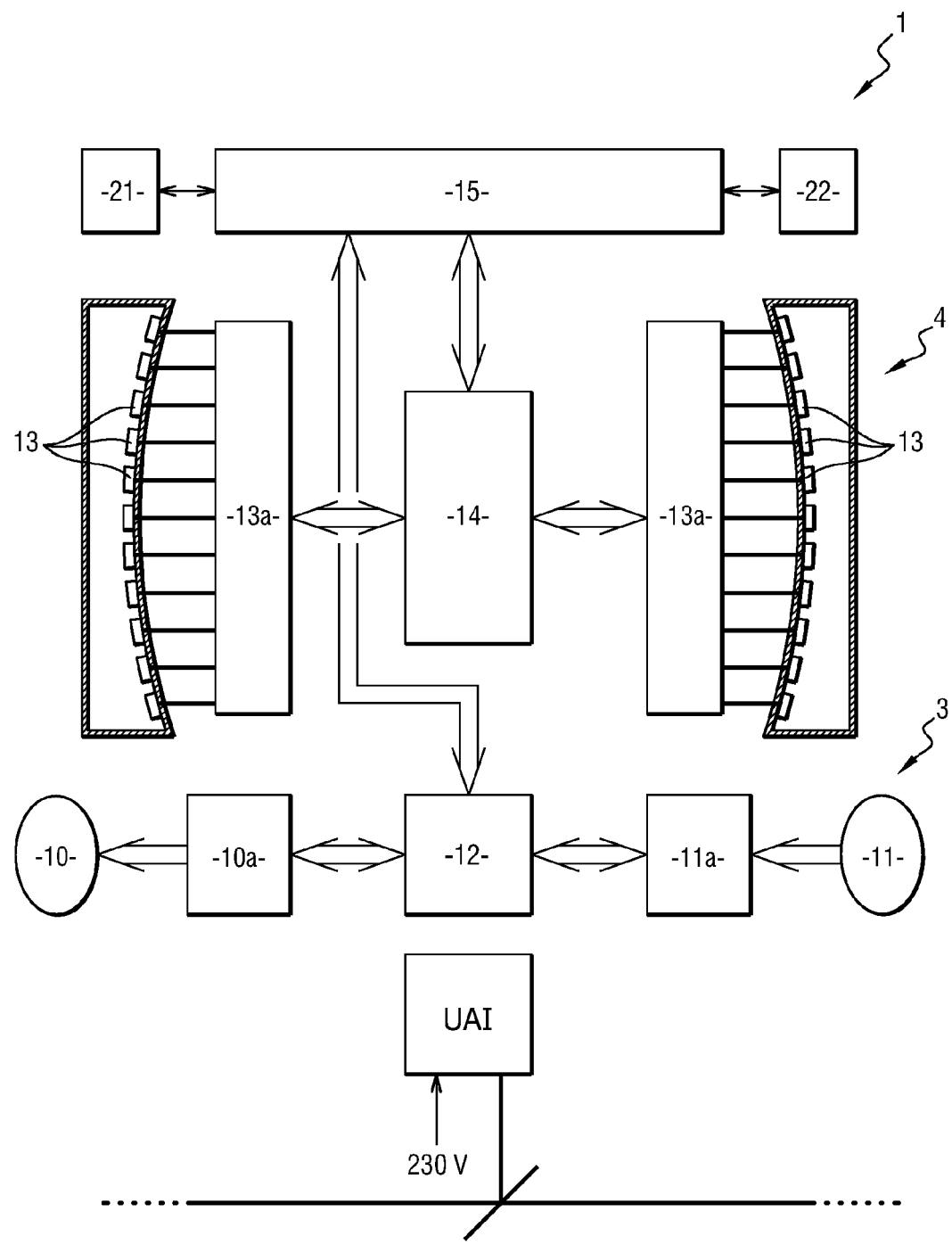
FIG. 4 is a synoptic view of one exemplary embodiment of the detection system according to one embodiment of the invention.

In the exemplary embodiment illustrated in FIG. 1, the system 1 comprises for example a first processing unit 15 associated with a first screen configured to generate a single output image from signals generated by the metal detector 3 and from the electronic image created by the body scanner 4 of one of the panels 5, and a second processing unit 15 associated with a second screen configured to generate a single output image from signals generated by the metal detector 3 and from the electronic image created by the body scanner 4 of the other of the panels 5. In the exemplary embodiment illustrated in FIG. 4, the same processing unit 15 is configured to generate the two electronic images.

In order to further improve the stability of the detection system 1, the coils of the transmitting assembly 10 and of the receiving assembly 11 of the metal detector 3 and the antennas 13 of the body scanner 4 can be rigidly fixed on the same base 17 in each panel 5.

In one embodiment, each base 17 comprises a non-magnetic metal plate in order to avoid deforming the lines of magnetic flux generated by the metal detector 3 and of high thickness. For example, each base 17 can comprise an aluminum plate having a thickness at least equal to 1 cm, for example 2 cm. Each base 17 preferably extends over the entire depth of the corresponding panel 5 that is to say between the entrance and the exit of the channel 6. In one embodiment, each base 17 is mounted at (or even against) the inner face 7 of the corresponding panel 5.

In addition, to prevent any relative movement between the two panels 5 of the system 1, the two bases 17 can be mechanically and rigidly connected. Indeed, relative movements between the bases 17 are likely to cause false alarms generated either by the metal detector 3 or by the body scanner 4. If applicable, to further improve the stability of the walk-through detector 4, the panels 4 are connected together in the upper part by a ceiling. For example, the bases 17 can be mechanically connected via a metal cross-member 18 extending between the panels 5, at ground level. Typically, in one exemplary embodiment, the bases 17 are mechanically connected at ground level by two metal cross-members 18. The cross-members 18 can for example be made of steel.

In one embodiment, so that this metal connection does not form an electrical loop with an unstable electrical resistance of large dimensions in the vicinity of inductive coils of the metal detector 3 and consequently risks generating additional false alarms, all or part of the cross-members 18 can be electrically insulated. For example, all or part of the cross-members 18 can be covered by a sleeve 19 made of a non-conductive material, typically plastic. Preferably, at least the portion of the bases 17 which extends to the junction between the cross-members 18 and the bases 17 is electrically insulated with such a sleeve 19.

Optionally, the shield 16 is rigidly fixed to the corresponding base 17 to guarantee that the relative movement between the antennas 13 and the transmitting 10 and receiving assemblies is minimized or canceled and, consequently, that the electromagnetic interference on the coils of the metal detector 3 and the associated false alarms are also suppressed. If applicable, the base 17 can also extend along the outer face of the corresponding panel 5. In this case, the shield 16 can be fixed on the part of the base extending along this outer face. In addition, in order avoid causing the inspected persons to trip during their passage through the channel, the walk-through detector 4 can further comprise a platform 20, extending between the panels 5 and covering the cross-members 18. Optionally, in order to prevent the trampling of the platform 20 from transmitting vibrations to the structure of the system 1, the platform 20 can be mechanically insulated from the structure of the walk-through detector 2 over its entire perimeter, for example by fixing said platform 20 to the ground.

In a manner known per se, the system 1 further comprises a power supply and interface unit UAI connected to the electrical network and, if applicable, to a communication network.

The invention claimed is:

1. A detection system comprising:
   a walk-through detector, said walk-through detector comprising two side panels substantially symmetrical with respect to a plane and being configured to define a transit channel for an inspected person, said side panels comprising successively along the plane a first portion at an entrance of the transit channel and a second portion extending between the first portion and an exit of the transit channel, the first portion and the second portion being monolithic, the first portion and the second portion of the side panels each having an inner face, the inner face of the first portion of one of the side panels facing the inner face of the first portion of the other of the side panels and the inner face of the second portion of one of the side panels facing the inner face of the second portion of the other of the side panels;
   a metal detector housed in the first portion of the side panels comprising a transmitting assembly configured to transmit a magnetic field and a receiving assembly configured to detect disturbances of the magnetic field due to a target object; and
   a body scanner housed in the second portion of the side panels, said body scanner comprising at least one antenna configured to emit radiant energy;
   wherein the inner faces of the first portion of the side panels are substantially planar and parallel to each other and are separated by a distance at least equal to 800 mm and less than or equal to 900 mm, and
   wherein the distance between the inner faces of the second portion of the side panels gradually increases from the first portion towards up to a maximum distance and then gradually decreases towards the exit of the transit channel, the maximum distance between the inner faces of the second portion of the side panels is greater than or equal to 1,000 mm and less than or equal to 1,200 mm.

2. The detection system according to claim 1, wherein the inner faces of the panels are substantially curved or planar piecewise.

3. The detection system according to claim 2, wherein a radius of curvature of the inner faces of the second portion of the side panels is comprised between 180 cm and 220 cm.

4. The detection system according to claim 1, wherein a depth of the first portion is comprised between 250 mm and 350 mm.

5. The detection system according to claim 1, wherein the distance between the inner faces of the first portion of the side panels is equal to 820 mm.

6. The detection system according to claim 1, wherein a total depth of the side panels, between the entrance and the exit of the transit channel, is comprised between 1,600 mm and 1,800 mm.

7. The detection system according to claim 1, wherein the at least one antenna of the body scanner is configured to transmit millimeter waves.

8. The detection system according to claim 1, wherein the body scanner comprises an array of antennas, said antennas being arranged along a curved surface.

9. The detection system according to claim 8, wherein the curved surface corresponds to all or part of the inner face of the second portion of one of the side panels.

10. The detection system according to claim 1, further comprising a processing unit configured to generate a single image from signals generated by the metal detector and from an electronic image created by the body scanner.

11. The detection system according to claim 1, wherein the first and the second panels each further comprise a metal shield positioned between at least one antenna and at least one of the transmitting assembly and the receiving assembly.

12. The detection system according to claim 11, wherein the metal shield is made of a metal having an electrical conductivity greater than or equal to 35*10^6 S/m.

13. The detection system according to claim 1, wherein the metal detector comprises a continuous detector or a pulsed wave detector.

14. The detection system according to claim 1, wherein each side panel houses a metal base, the transmitting assembly, the receiving assembly, and the at least one antenna being mounted on this same metal base so as to be mounted fixed relative to each other.

15. The detection system according to claim 14, wherein the metal bases are mechanically connected so as to be fixed relative to each other.

16. The detection system according to claim 15, wherein the metal bases are connected at ground level by at least one cross-member.

17. The detection system according to claim 16, wherein the at least one cross-member is metallic, said at least one cross-member being covered at a junction with each side panel by an electrically insulating sleeve.

18. The detection system according to claim 17, wherein all or part of the at least one cross-member is covered by the electrically insulating sleeve.

19. The detection system according to claim 17, wherein the at least one cross-member is housed in a platform extending between the side panels, said platform being mechanically insulated from said side panels.

20. The detection system according to claim 1, wherein a total depth of the side panels, between the entrance and the exit of the transit channel, is on the order of 1,760 mm.

* * * * *